United States Patent [19]

Montague

[11] 4,300,527

[45] Nov. 17, 1981

[54] BI-LOOP HEAT RECOVERY SYSTEM

[76] Inventor: Albert Montague, 1689 Blue Jay La., Cherry Hill, N.J. 08003

[21] Appl. No.: 7,412

[22] Filed: Jan. 29, 1979

Related U.S. Application Data

[63] Continuation-in-part of Ser. No. 838,749, Oct. 3, 1977, abandoned.

[51] Int. Cl.³ .................. F24H 3/00; F23J 11/00; F24B 7/00
[52] U.S. Cl. ................ 126/112; 126/312; 165/DIG. 2; 237/55
[58] Field of Search ........... 126/116 R, 112, 110 R, 126/15 R, 15 A, 312, 307 A; 237/55; 165/DIG. 2

[56] References Cited

U.S. PATENT DOCUMENTS

| 921,019 | 5/1909 | Speer | 126/112 |
|---|---|---|---|
| 1,752,663 | 4/1930 | Fagan | 126/15R |
| 2,151,642 | 3/1939 | Rose | 126/112 |
| 2,243,503 | 5/1941 | Frenette | 237/55 |
| 2,361,643 | 10/1944 | Mueller | 237/55 |
| 2,818,060 | 12/1957 | Field | 126/307 |
| 2,962,218 | 11/1960 | Dibert | 237/55 |
| 3,913,663 | 10/1975 | Gates | 237/55 |
| 3,934,572 | 1/1976 | Teague | 126/92 B |
| 4,038,963 | 8/1977 | Dingwall | 126/85 B |
| 4,044,820 | 8/1977 | Nables | 237/55 |
| 4,161,941 | 7/1979 | Bloxham | 126/112 |
| 4,194,488 | 3/1980 | Bellaff | 126/112 |

*Primary Examiner*—Daniel J. O'Connor
*Attorney, Agent, or Firm*—Hal Jay Bohner

[57] ABSTRACT

A heating system for dwellings or other enclosures includes a furnace in which a burner is isolated from a hot air or water system, and receives substantially all of its combustion air from outside the enclosure and preheated. A heat exchanger is provided between exhaust gases from the burner of the furnace and the combustion air.

6 Claims, 7 Drawing Figures ered through the most permeable portions of the structure of the enclosure, namely, gaps around window sashes, doors, down fireplace flues and the like. Even when such a system is not in operation, heated house air continues to be discharged through the stack because of buoyancy (differential temperature) and a venturi effect (suction) caused by wind across the stack which induces drafts into the enclosure. The passage of air often creates palpable drafts or cold spots. Moreover, since an entire building's heated (moist) air can be drawn through the furnace and exhausted to the atmosphere at rates ranging and at times exceeding 1–2 ft.$^3$/sec., considerable heat and moisture losses are characteristic of conventional systems of the above-described type. Furthermore, in an effort to save energy individuals are insulating their homes and closing off all drafts and air leaks. All fuel-burning appliances need air in order to burn the fuel properly. If an oil, gas, coal or wood furance is "starved" of its necessary intake air, it will operate inefficiently.

BI-LOOP HEAT RECOVERY SYSTEM

This application is a continuation-in-part of U.S. patent application Ser. No. 838,749 filed Oct. 3, 1977 and now abandoned.

BACKGROUND OF THE INVENTION

1. Field of the Invention

This invention relates to a bi-loop heat recovery system for a conventional gas, oil or coal fired heating system, and particularly to a heating system of the type suitable for heating a dwelling or other enclosure.

2. State of the Art

In conventional heating systems, air from the enclosure to be heated provides oxygen for combustion, and when the system is in operation, products of combustion together with any excess air are exhausted through a stack or other vent to the atmosphere. The air which is drawn into the furnace for combustion purposes and then discharged to the atmosphere must, of course, be replaced in the enclosure; and in conventional systems, this takes place by the drawing of cold outside air through the most permeable portions of the structure of the enclosure, namely, gaps around window sashes, doors, down fireplace flues and the like. Even when such a system is not in operation, heated house air continues to be discharged through the stack because of buoyancy (differential temperature) and a venturi effect (suction) caused by wind across the stack which induces drafts into the enclosure. The passage of air often creates palpable drafts or cold spots. Moreover, since an entire building's heated (moist) air can be drawn through the furnace and exhausted to the atmosphere at rates ranging and at times exceeding 1–2 ft.$^3$/sec., considerable heat and moisture losses are characteristic of conventional systems of the above-described type. Furthermore, in an effort to save energy individuals are insulating their homes and closing off all drafts and air leaks. All fuel-burning appliances need air in order to burn the fuel properly. If an oil, gas, coal or wood furance is "starved" of its necessary intake air, it will operate inefficiently.

It has therefore been proposed that heat losses can be reduced in heating systems by supplying fresh air to the return air stream. For example, in U.S. Pat. No. 2,962,218, issued Nov. 29, 1960, to Dibert, it was suggested that a preheated stream of cool external air be used to equalize the air pressure within the enclosure with outside atmospheric pressure, for a resultant reduction in seepage of external air. Similarly, in U.S. Pat. No. 1,726,727, issued Sept. 3, 1929, to Wood, a furnace is proposed in which fresh air may be preheated and then mixed with a supply stream drawn from return air.

It should also be understood that conventional heating systems can produce toxic carbon monoxide which represents a serious health risk. In particular, if the flue of a conventional furnace becomes blocked, the products of combustion, which can include carbon monoxide, can flow into the living space. Other malfunctions of a furnace can also result in carbon monoxide entering the living space. The severity of this and other furnace operating hazards has been recognized by the United States Consumer Product Safety Commission which found that between July, 1975, and July, 1976, an estimated 426 deaths were caused by carbon monoxide poisoning due to furnace malfunctions. In the past the only practical solution to this problem has been to insure that a furnace is properly operated and maintained.

SUMMARY AND OBJECTS

The present invention is directed to a heating system for residences or other such buildings in which the problems of "induced" drafts and resulting heat losses and losses of cooled, conditioned air in the summer are eliminated by an arrangement in which substantially all of the air used by the heating unit for combustion, draft and ventilation purposes is drawn directly from outside the enclosure and preheated before combustion. In such a system the products of combustion and exhaust gases are substantially free of heated (moist) air from the interior of the enclosure, thus negating the tendency of the furnace to draw cold (dry) air into the heated interior of the enclosure (by eliminating induced drafts through cracks or openings), while providing the furnace with adequate air for combustion and at an intake air temperature that is significantly higher than existing outside ambient air levels.

It is another object of this invention to provide a furnace system which is safer than prior furnaces. In particular, the present system eliminates the risk of introducing carbon monoxide into the living space associated with the furnace, e.g., due to a blocked flue.

Furthermore, retrofit of this bi-loop system on an existing furnace will not produce an adverse effect on the design and operating characteristics of the furnace established by the manufacturer. To the contrary, the bi-loop system enhances furnace efficiency and reduces or eliminates the need for an auxiliary humidification system.

Another unique feature of the bi-loop system is the maintenance of equal atmospheric pressure at points common to the burner and vent. That is, in gas-fired units a common duct point supplies air to the combustion and draft air inlets, and in oil-fired units a common duct point supplies air to the burner and barometric draft regulator.

The foregoing and other objects of this invention are realized, in a presently preferred form of the invention, by a system in which a furnace is provided with a burner isolated from the air in the enclosure, but supplying heat for the enclosure by indirect heat exchange. An exhaust duct is provided for conducting exhaust gases away from the burner and out of the enclosure. Supply and return conduits conduct the working fluid to be heated (which may be water, steam, or air) from the interior of the enclosure through the furnace. An air supply duct extends from outside the enclosure directly to the burner, and air in the duct is preheated by indirect heat exchange before entry into the burner. No other substantial source of combustion, draft and ventilation air is used.

FIGURES

For the purpose of illustrating the invention, there is shown in the drawings a form of the invention which is presently preferred—it being understood, however, that this invention is not limited to the precise arrangements and instrumentalities shown.

DETAILED DESCRIPTION OF THE PREFERRED EMBODIMENTS

Figure 1:
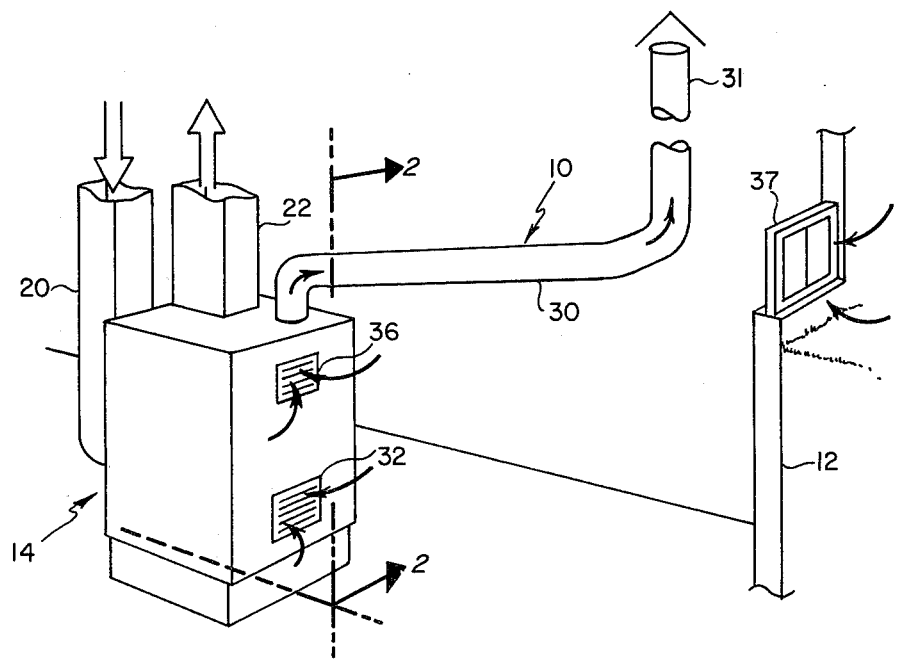
FIG. 1 is an illustration of a conventional heating system.
Figure 2:
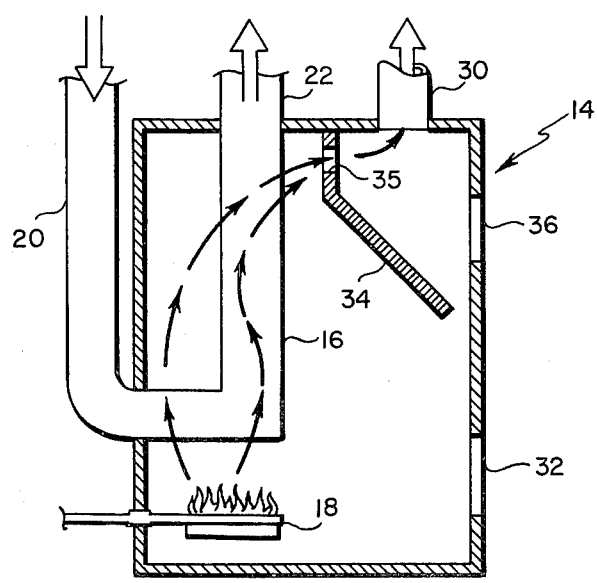
FIG. 2 is a cross-sectional view of a conventional furnace.

Referring now to the drawings in detail, wherein like numerals indicate like elements, there is seen in FIGS. 1 and 2 a conventional heating system, designated generally by the reference numeral 10, the heating system being disposed within an enclosure 12. The enclosure 12 may be the basement of a building for residential or other use.

Disposed within the enclosure 12 and forming a part of the heating system 10 is a furnace designated generally by the reference numeral 14. The furnace 14 is conventional, and includes a heating element 16 within the interior of the furnace 14. The heating element 16 is represented as a conduit in a hot air system, but the principles of the present invention can also be applied to steam or hot water heating systems.

The furnace 14 has an air intake pipe 20, and a return pipe 22, which are connected together by the heating element 16. The return pipe 22 has at its remote end (not shown) suitable outlets for heating the interior of the building. Burner 18 applies heat to the air as the air passes through the heating element 16. A conventional pilot light, not shown, is located inside the furnace near the burner 18 to provide a continuous flame to ignite the fuel at the burner. A conventional thermocouple safety system is provided including a thermocouple located in or near the flame of the pilot light and coupled to a control system which in turn is coupled to a valve in the line supplying fuel to the pilot light and the burner. Thus, if the pilot light is extinguished, due to wind for example, the thermocouple cools thereby activating the control circuit to prevent fuel from flowing to the pilot light or to the burner. Exhaust gases from the burner 18 leave the furnace 14 through an exhaust duct 30, and then flow to an exhaust stack 31 located on the roof of the building.

A combustion air inlet 32 is formed in the side of the furnace 14 to permit air from inside the enclosure 12 to enter the furnace to provide oxygen for combustion of fuel in the burner 18. A draft diverter plate 34 is affixed inside the furnace beneath the exhaust duct 30 and extends across the furnace. The plate is provided with a port 35 to permit combustion gases rising from the burner 18 to flow to the exhaust duct 30. The lower edge of the draft diverter plate 34 is adjacent to and spaced apart from the furnace wall. A draft diverter port 36 is formed in the side of the furnace 14 above the lower edge of the draft diverter plate 34 to provide backdraft relief. The draft diverter port 36 is the discharge point from the furnace for hazardous combustion products when the exhaust duct 30 becomes blocked. When the furnace is properly operating, the hot gases rising through the stack can induce a flow of air into the furnace. To prevent this induced flow from upsetting combustion at the burner, air is admitted through the draft diverter port 36. The draft diverter inlet may also have other equally suitable locations.

It should now be apparent that in the illustrated form of the heating system, air traversing the heating element 16 can acquire heat by indirect heat exchange from the burner 18, and that the air thus heated is distributed through the return pipe 22 to desired parts of the building. Air for combustion, draft and ventilation on the other hand, enters the enclosure 12 via window 37 or other appropriate opening and flows into the furnace through inlet 32 and port 36. The combustion products pass to the atmosphere through the exhaust duct 30 and the stack.

Figure 3:
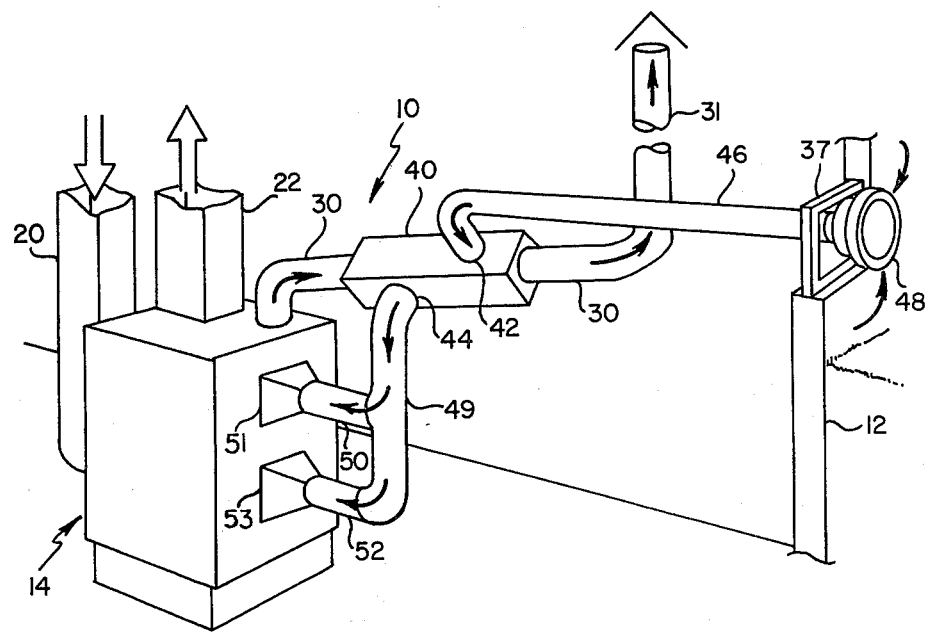
FIG. 3 illustrates a system according to the present invention.

Turning now to FIG. 3, there is illustrated a preferred form of the present invention installed in conjunction with the conventional heating system 10. According to FIG. 3, a heat exchanger 40 is connected in heat flow communication with the exhaust duct 30, as will be discussed hereinafter. The illustrated heat exchanger 40 includes a rectangular conduit which encloses the exhaust duct 30, and inlet and outlet ports 42 and 44, respectively, are formed in opposite ends of the heat exchanger. An inlet duct 46 is connected between the inlet port 42 and a specially designed vent cap 48 mounted in the window 37. A duct 49 with flexible characteristics along part of its length and with a slip-fit joint is coupled to the outlet port 44 and is in turn coupled to an upper draft diverter duct 50, and a lower combustion air duct 52. The draft diverter duct 50 is coupled to the draft diverter port 36 with a transition 51 for uniform air distribution, and likewise the combustion air duct 52 is coupled to the combustion air inlet 32 with a transition 53 for uniform air distribution.

In operation of the system illustrated in FIG. 3, air for combustion enters through the specially designed vent cap 48 and flows through the heat exchanger 40 thereby acquiring heat. The heated combustion air thence flows into the furnace via ducts 50 and 52.

One aspect of the present invention is conversion of the aforementioned conventional heating system to the present system whereby the conversion can be accomplished easily and with little alteration of the existing furnace system. Conversion of the existing conventional heating system shown in FIG. 1 to the presently preferred bi-loop system shown in FIG. 3 can now be understood. Initially a length of the exhaust duct 30, having substantially the same length as the heat exchanger 40, is removed. Then the heat exchanger 40 is connected to the exhaust duct 30 in place of the removed section. Next, the specially designed vent cap 48 is installed in the window 37, and the inlet duct 46 is connected between the vent cap 48 and the inlet port 42. Then the ducts 49, 50 and 52 are coupled to the heat exchanger 40; and the ducts 50 and 52 are connected in sealing engagement with the draft diverter port 36 and cumbustion air inlet 32, respectively, via transitions 51 and 53. In practice, selected ducts forming the present system are crimped at their ends so that they can be fitted into other uncrimped ducts quickly and easily while providing an effective joint therebetween. Preferably openings in the furnace 14 not coupled to ducts of the present system are sealed. Thus, the only means for combustion, draft and ventilation air to enter the furnace is via the heat exchanger 40.

Figure 4:
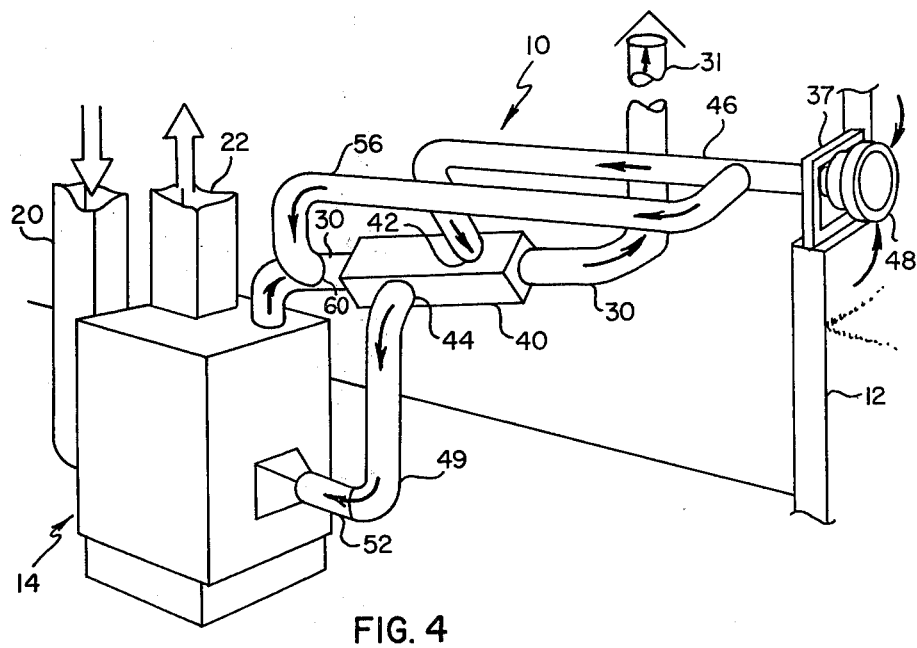
FIG. 4 illustrates another embodiment according to the present invention.

It should be understood that some conventional heating systems, unlike the system shown in FIG. 1, include a barometric draft regulator 60 disposed on the side of the exhaust duct 30. Conventional systems having a barometric draft regulator 60 lack a draft diverter inlet 36. Turning now to FIG. 4, there is illustrated a bi-loop system applied to a conventional furnace having a barometric draft regulator. It should be appreciated that the barometric draft regulator 60 includes a circular plate 62 pivotably mounted on a rod 64 to selectively open and close, to maintain a desired flow of combustion air to the burner. This will be discussed below.

Figure 5:
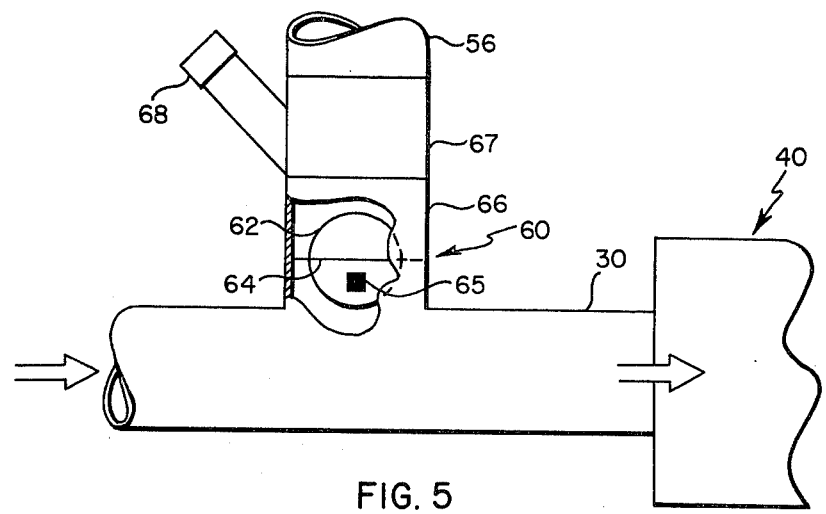
FIG. 5 illustrates one element of the system shown in FIG. 4.

In accordance with the system shown in FIGS. 4 and 5 a conduit 56 is connected to the air inlet duct 46 near the vent cap 48. The conduit 56 is connected at its other end to a Y-shaped connector 67 which has a removable cap 68 connected to one leg. The third leg of the Y-shaped connector 67 is connected to the barometric draft regulator housing 66. In operation, when the furnace is functioning, circular plate 62 is maintained generally in a position to partially obstruct the flow of air through conduit 67. The orientation of the plate 62 is a function of furnace draft passing through conduit 30 and positioning of a counterweight 65. Therefore, installation of the Y-shaped connector 67 must provide for free and unimpeded movement of the circular plate 62. Adjustment of the draft regulator to obtain proper draft can be accomplished by removing the access hole cap 68, and adjusting the counterweight 65, then replacing the cap. It should be appreciated that hot gases rising through the stack 31 can induce excessive air into the furnace. The draft regulator prevents this by admitting air into conduit 30 via conduit 56. The rate of flow through conduit 56 is controlled by the plate 62.

Figure 6:
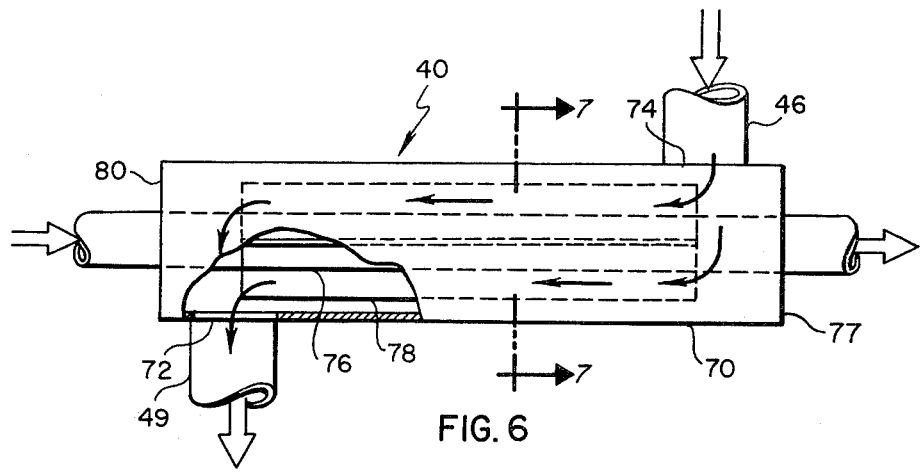
FIG. 6 illustrates another element of the system shown in FIG. 4.
Figure 7:
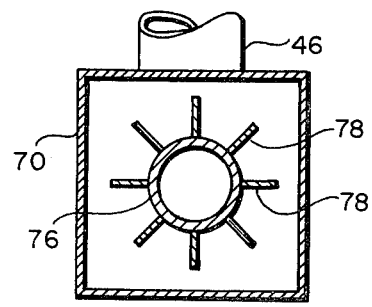
FIG. 7 illustrates a cross-sectional view of the device shown in FIG. 6 taken along line 7—7.

Turning now to FIGS. 6 and 7 there is illustrated the preferred form of the heat exchanger 40. The illustrated heat exchanger 40 includes a substantially rectangular conduit 70 with an inlet port 72 formed in its upper left end and an outlet port 74 form in its lower right end. The inlet and outlet ports can optionally be located 90° from one another, as well as 180° as in the illustrated configuration. A conduit 76, having a diameter substantially less than that of the conduit 70 extends through the conduit 70 parallel to the axis thereof. Two annular end caps 77 and 80 are affixed one to each end of the conduit 70 to cover the space between the conduits 70 and 76 and sealingly couple to the conduits. A plurality of radially extending fins 78 are affixed within the conduit 70 to extend longtitudinally for part of the length of the conduit 70 but spaced apart from the end caps 77 and 80 to provide for annular mixing chambers 82 and 84. The fins extend radially from the inner conduit 76 toward but separated from the outer conduit 70. The interior of conduit 76 can be considered a first zone of the heat exchanger, and the space between the conduits 76 and 70 a second zone. In operation, hot gas from the furnace flows through the inner conduit 76, i.e., the first zone, as illustrated by the arrows, thereby heating the fins 78. Cold air from the conduit 46 flows between the fins 78 in the second zone and acquired heat therefrom, and the heated air flows through conduit 49 and thence to the furnace.

It can now be understood that the systems illustrated in FIGS. 3 and 4 include two bi-loop features. In particular, one loop includes the stack, the exhaust duct 30, duct 49, the heat exchanger 40, and the inlet conduit 46. The two systems also include a second bi-loop feature. That is, according to FIG. 3, the one loop comprises conduit 50 while the second loop comprises conduit 52. In the FIG. 4 system one loop comprises conduit 49, and the second loop comprises conduit 56.

It should be appreciated that these bi-loop configurations insure that equal atmospheric pressure is maintained at points common to the burner and the draft diverter port 36 in the FIG. 3 system, and to the burner and the draft regulator 60 in the FIG. 4 system. That is, air is supplied from a single source, vent cap 48.

Another important feature of the present bi-loop system can now be understood. According to conventional systems such as illustrated in FIGS. 1 and 2, the furnace communicates with the enclosure 12 via ports 32 and 36. In such a system if certain malfunctions occur, toxic carbon monoxide can be generated by the furnace to flow into the enclosure 12 and thence into a living space such as a home. For example, if the chimney becomes blocked, exhaust gases from the furnace, which can contain carbon monoxide, can be forced into the enclosure 12 from port 36. As another example, if the free flow of air into the furnace via port 32 is restricted, inadequate oxygen for combustion may be available and carbon monoxide can be generated and enter the enclosure 12 through port 32. The present bi-loop system, on the other hand, insures that carbon monoxide is not produced to accumulate in the enclosure 12.

The present bi-loop system includes conduits 46 and 49 which convey air directly from the space outside the enclosure 12 to the furnace. Thus, the ports 32 and 36 cannot become obstructed, which obstruction would lead to production of carbon monoxide. Moreover, according to the present bi-loop system, if the chimney becomes plugged, toxic gases cannot flow into the living space. More particularly, applicant has tested his system and found that if the chimney is blocked, products of combustion build up for a short time inside the furnace 14. However, because these products of combustion contain little or no oxygen, the flame at the pilot light, not shown, is quickly altered in size and shape and then extinguished thereby causing the thermocouple which is located in or near the pilot light flame to cool thus activating the conventional safety system to stop the flow of fuel to the pilot light and to the burner 18. Consequently, the flame at the burner 18 is quickly extinguished, and the production of hazardous combustion gases ceases. Thus, no substantial quantities of toxic gases such as carbon monoxide are generated. Smoke damage which often results when oil furnaces malfunction will also be eliminated by this early shut-down feature. Moreover, the small quantity of combustion gases which are generated during malfunctioning cannot be released into the enclosure 12, but rather accumulate within the furnace 14 and flow therefrom via conduit 46 to the area outside the enclosure 12.

Likewise, according to the FIG. 4 system, if the chimney becomes blocked, products of combustion build up inside the furnace for a short time until the flame is extinguished. The small quantity of combustion gases which are generated are discharged via conduit 46 to the area outside the enclosure 12.

I claim:

1. In a furnace located in an enclosure, the furnace having a burner, at least one combustion air inlet formed in the furnace for permitting air to flow from the enclosure into the furnace for combustion, a draft diverter port formed in the furnace, an exhaust duct, and a stack coupled to the exhaust duct for exhausting the products of combustion from the enclosure, an improved system comprising:

(a) heat exchange means which can be quickly and easily coupled to the exhaust duct to provide a first zone to carry products of combustion and a second zone in heat flow communication with the first zone to carry a stream of air;
(b) first conduit means which can be quickly and easily coupled to provide gas flow communication between a point outside the enclosure and the second zone of said heat exchange means; and
(c) second conduit means which can be quickly and easily coupled to provide continuous and uninterrupted gas flow communication between the second zone of said heat exchange means and the at least one inlet formed in the furnace whereby air for combustion in the furnace is supplied from a point outside the enclosure, and the air for combustion is preheated in said heat exchange means; wherein said second conduit means includes a first conduit coupled in flow communication between the second zone of said heat exchange means and said draft diverter port and further includes a second conduit coupled in flow communication between the second zone of said heat exchange means and said combustion air inlet.

2. The system according to claim 1 wherein said first conduit means is disposed so that the point outside the enclosure is substantially spaced apart from the point where the stack terminates so that no substantial quantity of the products of combustion from the stack is aspirated into the air carried by said first conduit means.

3. A system according to claim 1 wherein said heat exchange means is constructed so that the first zone continuously and uninterruptedly carries products of combustion and said second zone continuously and uninterruptedly carries a stream of air.

4. A system according to claim 1 wherein said heat exchange means includes a third conduit which can be quickly and easily coupled to said exhaust duct so that the products of combustion are carried within said third conduit.

5. A system according to claim 4 wherein said third conduit has a plurality of radially-extending fins affixed to its outer surface.

6. A system according to claim 4 wherein said heat exchange means includes a fourth conduit disposed around said third conduit to form said second zone between said third conduit and said fourth conduit.

* * * * *